United States Patent
Parish

(10) Patent No.: US 9,553,358 B2
(45) Date of Patent: Jan. 24, 2017

(54) DIRECTIVE ARRAY FOR DRIVE-BY METER READING

(71) Applicant: Mueller International, LLC, Atlanta, GA (US)

(72) Inventor: Edward C. Parish, North Reading, MA (US)

(73) Assignee: Mueller International, LLC, Atlanta, GA (US)

( * ) Notice: Subject to any disclaimer, the term of this patent is extended or adjusted under 35 U.S.C. 154(b) by 135 days.

(21) Appl. No.: 14/193,302

(22) Filed: Feb. 28, 2014

(65) Prior Publication Data

US 2015/0247741 A1 Sep. 3, 2015

(51) Int. Cl.
*G01D 4/00* (2006.01)
*H01Q 1/32* (2006.01)
*H01Q 3/40* (2006.01)
*H01Q 25/00* (2006.01)

(52) U.S. Cl.
CPC ............ *H01Q 1/3275* (2013.01); *G01D 4/004* (2013.01); *H01Q 3/40* (2013.01); *H01Q 25/002* (2013.01)

(58) Field of Classification Search
CPC .......... G01D 4/006; G01D 4/00; G01D 4/002; G01D 4/004; G01D 4/008; H01Q 1/2233; H01Q 1/3275; H01Q 3/40; H01Q 25/002; H01Q 1/00; H01Q 1/22; H01Q 1/2208; H01Q 1/2216; H01Q 3/30; Y04S 20/325; Y02B 90/243; G08C 17/02
USPC ........................ 340/870.02, 870.03
See application file for complete search history.

(56) References Cited

U.S. PATENT DOCUMENTS

| | | | | |
|---|---|---|---|---|
| 3,886,554 A | * | 5/1975 | Braun | G01S 5/04 342/457 |
| 5,089,829 A | * | 2/1992 | Haruyama | H01Q 5/00 343/790 |
| 5,463,405 A | | 10/1995 | Liu | |
| 5,557,290 A | * | 9/1996 | Watanabe | H01Q 1/1285 343/713 |
| 5,825,302 A | * | 10/1998 | Stafford | G06K 7/0008 340/10.41 |
| 6,232,926 B1 | * | 5/2001 | Nguyen | H01Q 1/1285 343/704 |
| 2007/0069029 A1 | * | 3/2007 | Bauchot | G06K 17/0032 235/462.45 |
| 2013/0281009 A1 | * | 10/2013 | Parish | H04B 7/155 455/7 |

(Continued)

OTHER PUBLICATIONS

Badger, Understanding RF Propagation of AMR/AMI Systems, 2011, pp. 1-20.*

(Continued)

*Primary Examiner* — Brian Wilson
(74) *Attorney, Agent, or Firm* — Taylor English Duma LLP

(57) ABSTRACT

Antenna assemblies, which may be used in meter reading systems, are provided. One example of antenna assembly includes a first antenna vertically configured to be mounted on a top surface of a vehicle and a second antenna vertically configured to be mounted on the top surface of the vehicle. The antenna assembly also includes a receiver configured to communicate with a plurality of wireless utility meters via the first and second antennas. The first and second antennas are aligned with a direction of travel of the vehicle.

18 Claims, 7 Drawing Sheets

(56) References Cited

U.S. PATENT DOCUMENTS

2014/0330353 A1* 11/2014 Knight ................ A61N 1/0529
607/101

OTHER PUBLICATIONS

Laird Technolgies, Vertically Polarized Omni Antennas OD9, 2009, p. 1.*
Parish, Edward C.; Non-Final Office Action for U.S. Appl. No. 14/859,626, filed Sep. 21, 2015, mailed Nov. 25, 2015, 22 pgs.
Parish, Edward C.; U.S. Patent Application Entitled: Directive Array for Drive-By Meter Reading having U.S. Appl. No. 14/859,626, filed Sep. 21, 2015, 32 pgs.
Laird Technologies, Vertically Polarized Omni Antennas OD9, 2009, p. 1.
Parish, Edward C.; Final Office Action for U.S. Appl. No. 14/859,626, filed Sep. 21, 2015, mailed May 19, 2016, 21 pgs.

* cited by examiner

DIRECTIVE ARRAY FOR DRIVE-BY METER READING

TECHNICAL FIELD

The present disclosure generally relates to antennas, and more particularly relates to antenna assemblies having directional radiation patterns.

BACKGROUND

Public utilities, such as water, power, and gas, are provided to the properties of a number of customers. Utility meters at the customers' properties are used for measuring the usage of these utilities. Additionally, the utility meters may provide data related to pressure, temperature, quality, leaks, bursts and tampering, among other data. In recent years, some utility meters have been equipped with wireless transmission capabilities for transmitting the utility usage data to a meter reader (e.g., a device for reading or recording meter data). The transmission of data allows the meter reader to read utility meters at a distance, without many of the difficulties that are associated with visually reading meters at a residence or business. For instance, the practice of reading utility meters remotely eliminates the need to access the utility meters, which may be inside buildings, hidden behind shrubbery or fences, etc. Also, with wireless transmitting meters, a utility employee does not need to snoop around the sides of houses or encounter potentially hostile pets or wildlife.

With the transmission of utility data, utility companies can use compatible wireless receivers that can be handled by meter reading employees. These employees can carry the receivers within radio range of the customers' meters to obtain the utility data. Often, utility employees can walk or drive down streets, side streets, alleys, etc., to obtain the utility data. Some systems allow the meter reader to remain inside the vehicle without having to experience the problems associated with the typical visual reading methods. In some cases, the wireless receiving equipment may be directly mounted on the vehicle, so that the employee is required to simply drive down the streets where the customers are located.

FIGS. 1A and 1B are side and top views of a meter reading system 10 according to conventional systems. The meter reading system 10 includes a vehicle 12 and an antenna 14 mounted on top of the vehicle 12. The antenna 14 receives wirelessly transmitted signals from the utility meters as the vehicle 12 is driven along the roads where utility customers are located.

FIG. 2 is a bird's eye view of the conventional meter reading system 10 shown in FIGS. 1A and 1B. In this figure, an approximate communication range 16 of the antenna 14 is shown. In this case, the communication range 16 is omnidirectional and substantially forms a circle having a radius "r". Therefore, in conventional systems, the antenna 14 is able to obtain transmitted utility data from utility meters 18 (e.g., water meters, gas meters, electricity meters) of multiple customers inside the area "a", which is defined by the range 16 of the antenna 14 and associated equipment. Of course, as the vehicle 12 is driven along the street 20, the radius "r" may stay substantially the same, but the area "a" will change according to the moveable location of the antenna 14. Conventional meter reading systems typically have a communication range 16 of up to about 500 feet.

SUMMARY

The present disclosure describes various implementations of antenna assemblies for meter reading systems. According to one implementation, a system comprises a receiver and an antenna assembly. The receiver is configured to receive usage data related to usage of a utility at a customer location from a plurality of utility meters. The antenna assembly is coupled to the receiver and includes at least a housing and a plurality of antennas. The housing is mounted on the top surface of a vehicle. Each of the antennas has a base connected to a top of the housing and extends from the top of the housing in a direction substantially perpendicular to the ground. The antennas are arranged in a plane substantially parallel to a first axis corresponding to a forward direction of the vehicle. The antenna assembly is configured to receive the wirelessly transmitted usage data from the plurality of meters.

According to another implementation, a meter reading apparatus comprises a receiver and an antenna assembly. The antenna assembly includes at least a housing and a plurality of antennas. The housing is mounted on a top surface of a vehicle and each antenna extends from the housing in an upward direction. The antennas are arranged in a plane substantially parallel to a straight forward direction of the vehicle.

Other implementations are also disclosed. For example, the present disclosure provides an antenna assembly comprising a first antenna and a second antenna. The first antenna is vertically mounted on a top surface of a vehicle and the second antenna is vertically mounted on the top surface of the vehicle. The first and second antennas are aligned with a direction of travel of the vehicle.

These and other features and aspects of the various embodiments will become apparent upon reading the following Detailed Description and reviewing the accompanying drawings.

BRIEF DESCRIPTION OF THE DRAWINGS

The features illustrated in the following figures are intended to emphasize the general principles of the present disclosure and are not necessarily drawn to scale. Consistent reference characters are used throughout the figures to designate corresponding features.

DETAILED DESCRIPTION

The present disclosure describes antenna assemblies, particularly mobile antenna assemblies. The mobile antenna assemblies may be mounted on a vehicle for transporting the antenna assemblies throughout an area or in other embodiments may be configured to be carried by a person. Furthermore, the mobile antenna assemblies described in the present disclosure may be used for receiving utility data from utility meters at customer locations. The customers, as defined in the present disclosure, may include families, businesses, schools, or other entities that use public utilities, such as water, electricity, and gas. In some embodiments, the antenna assemblies may be designed to receive multiple utility readings or even different types of utility readings from each customer location at a time.

Although various implementations of the invention are described for the purpose of obtaining utility data from utility meters, the invention may also be configured, implemented, embodied, or used for transmitting and/or receiving wireless communication signals to or from other receiving/transmitting equipment located at various locations. In some embodiments, the antenna assemblies may simply receive signals, while other embodiments may include only transmitting signals. Still other embodiments may include both transmitting and receiving signals.

The antenna assemblies described herein can be mounted on any type of vehicle, depending on the particular application, for transporting the antenna assemblies to locations within range of various communication equipment located at different sites. Additional features and advantages, which may be apparent to one of ordinary skill in the art upon consideration of the general principles described herein, are intended to be included in the present disclosure.

Figure 1A:
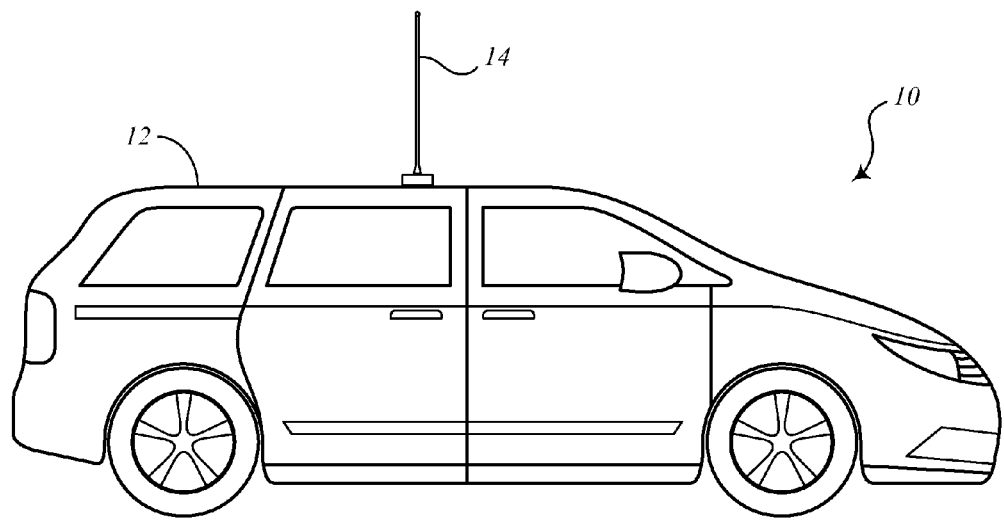
FIGS. 1A and 1B are side and top views of a conventional meter system.
Figure 1B:
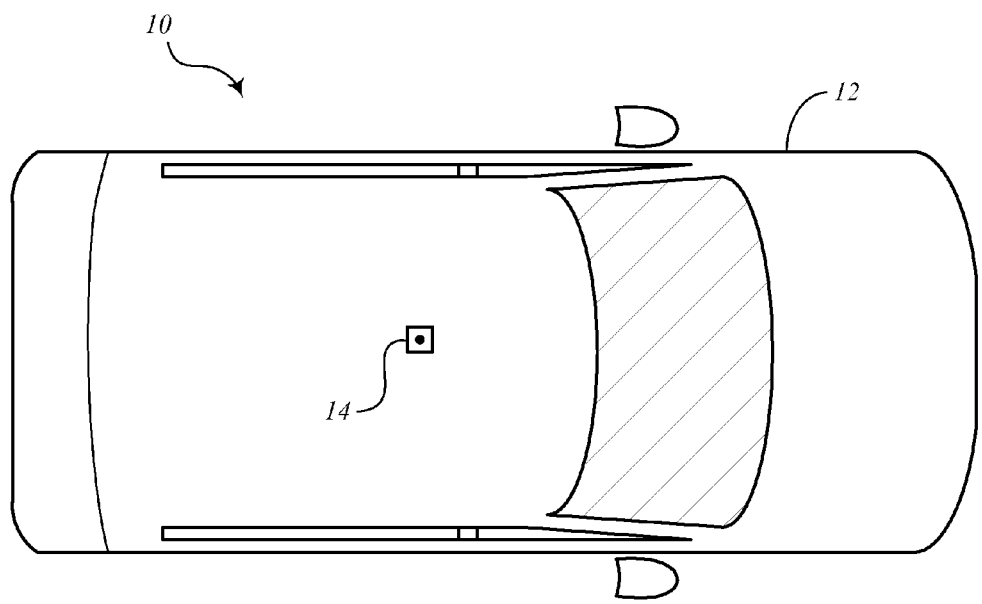
Figure 2:
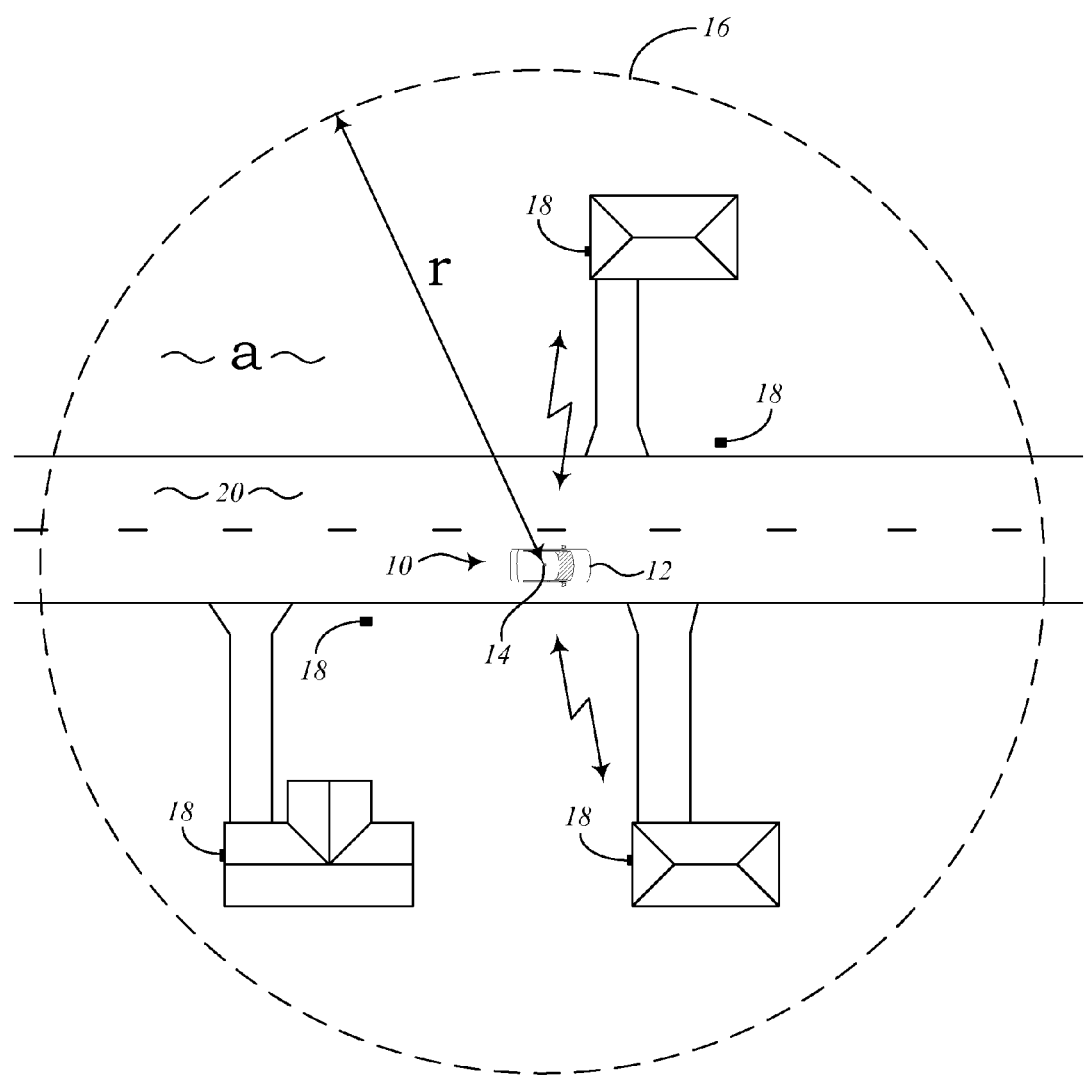
FIG. 2 is a top view showing a communication range of the conventional meter system shown in FIGS. 1A and 1B.
Figure 3A:
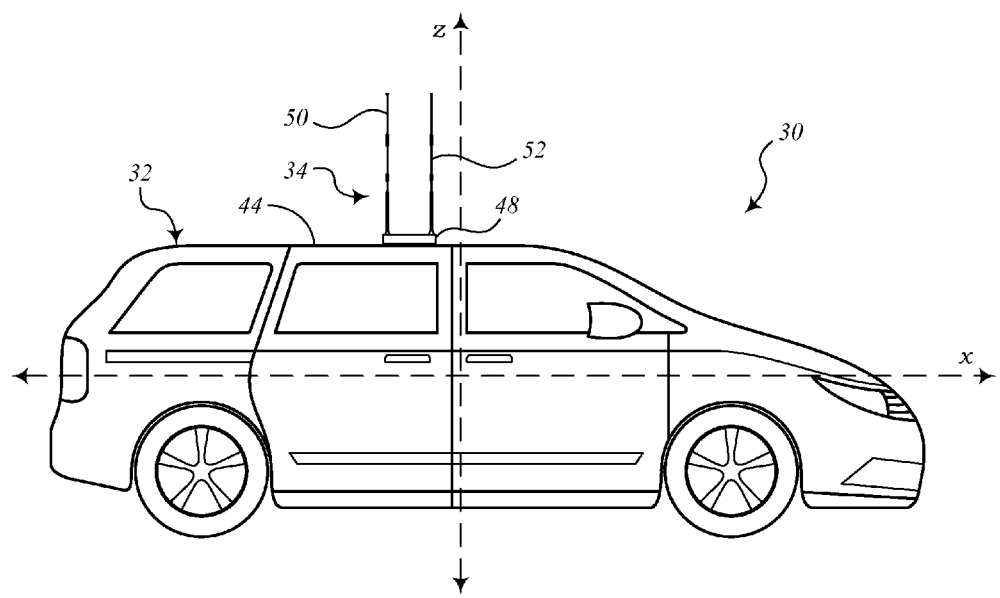
FIGS. 3A-3C are side and top views of a first embodiment of a meter reading system according to various implementations of the present disclosure.
Figure 3B:
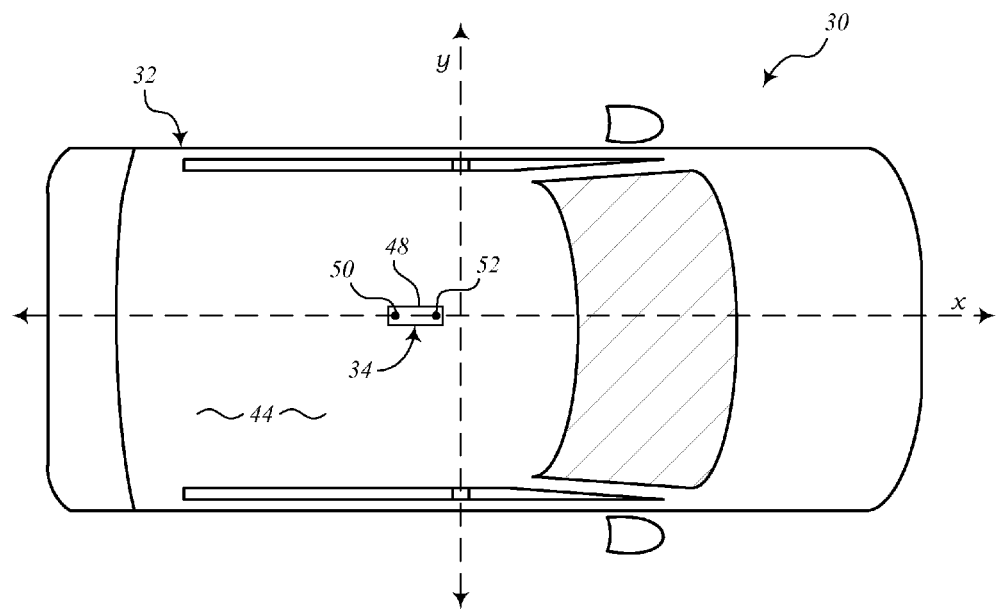

FIG. 3A is a side view of a meter reading system 30 according to a first embodiment. FIG. 3B is a top view of the meter reading system 30. The meter reading system 30 comprises a vehicle 32 and an antenna assembly 34. Although the vehicle 32 is shown as an automobile, it should be noted that the vehicle 32 may be any suitable type of transportation device, such as a car, motorcycle, pick-up truck, large truck, bus, van, minivan, sport-utility vehicle (SUV), train, subway train, streetcar, cable car, tram, boat, scooter, moped, etc. In order to describe the location of the antenna assembly with respect to the vehicle's general direction of travel, three axes are defined. A first axis x is substantially parallel to the ground and is oriented with respect to the general direction that the vehicle 32 travels when going forward. A second axis y is oriented perpendicular to the first axis x and is substantially parallel with the ground. A third axis z is oriented substantially perpendicular to the ground, the first axis x, and the second axis y.

Figure 3C:
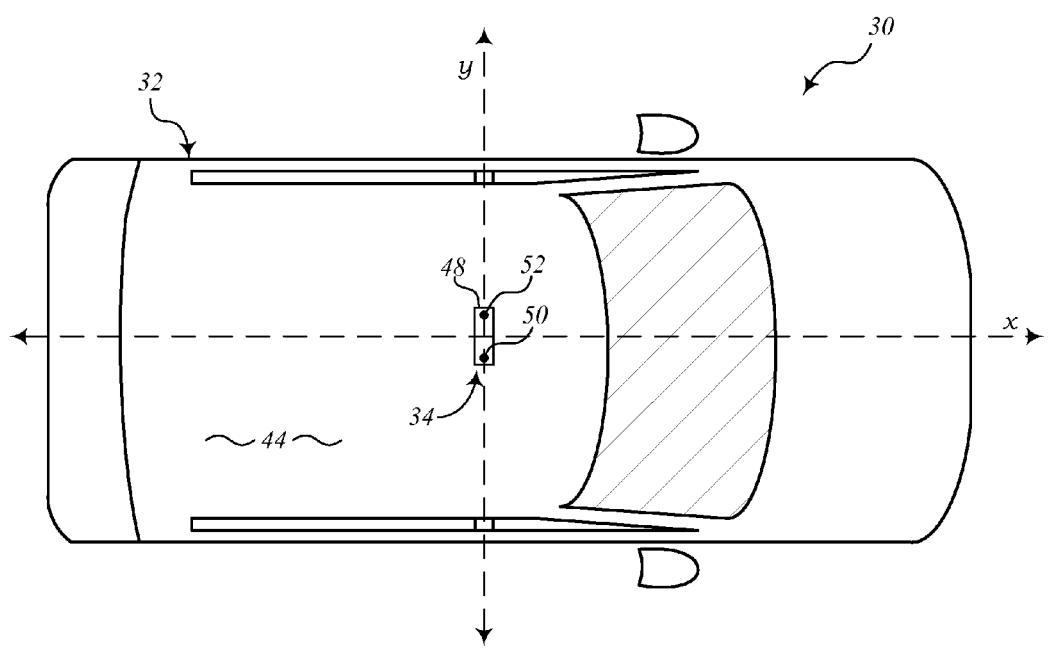

The antenna assembly 34 in this embodiment includes a housing 48, a first antenna 50, and a second antenna 52. The housing 48 is configured to be attached to a top surface 44 of the vehicle 32. The first antenna 50 and second antenna 52 may be mounted on top of the housing 48 and are oriented in an upward direction substantially parallel with the z axis. If the top surface 44 of the vehicle 32 is not sufficiently horizontal, then various types of support and/or leveling equipment may be used to orient the first antenna 50 and second antenna 52 in the upward direction. Also, the antennas 50 and 52 are oriented with respect to each other on the housing 48 such that they are substantially aligned with the x axis. In some embodiments, the antennas 50 and 52 may be positioned such that they form a plane that is substantially perpendicular to the x axis, or, in other words, is aligned with or substantially parallel to the plane formed by the y and z axes, as shown in FIG. 3C.

Although not shown in the drawings, feet, pads, or other elements may be formed on a bottom surface of the housing 48. As such, these elements may be used to protect the top surface 44 of the vehicle from scratches or dents. Also, the elements may be used to level the housing 48 as needed. In some embodiments, the elements on the bottom of housing 48 may include magnets, suction cups, straps, or other support components to minimize movement of the antenna assembly 34 with respect to the top surface 44 once antenna assembly 34 is placed on top of the vehicle 32 in the correct orientations as mentioned above.

Figure 4A:
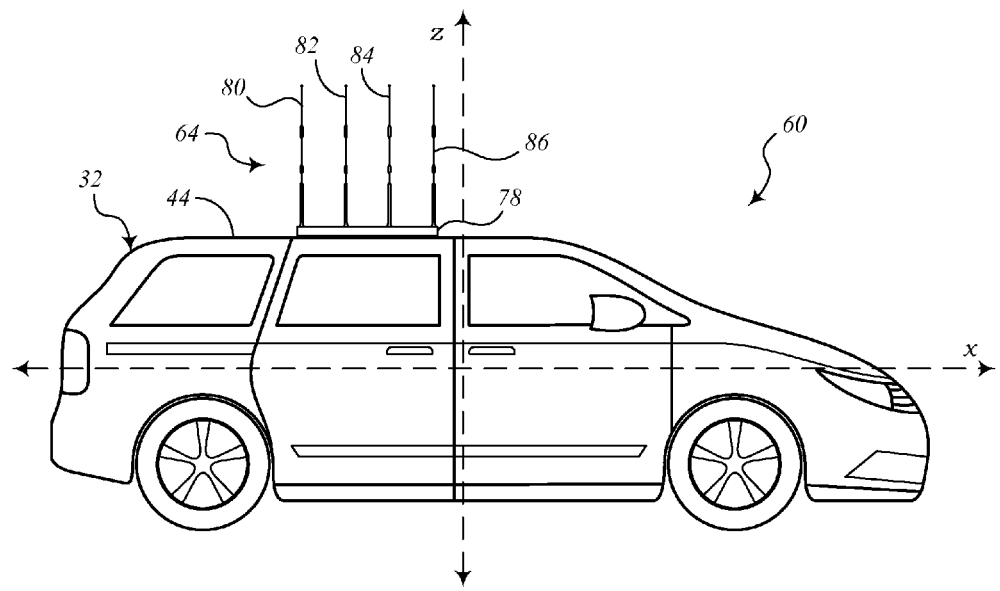
FIGS. 4A and 4B are side and top views of a second embodiment of a meter reading system according to various implementations of the present disclosure.
Figure 4B:
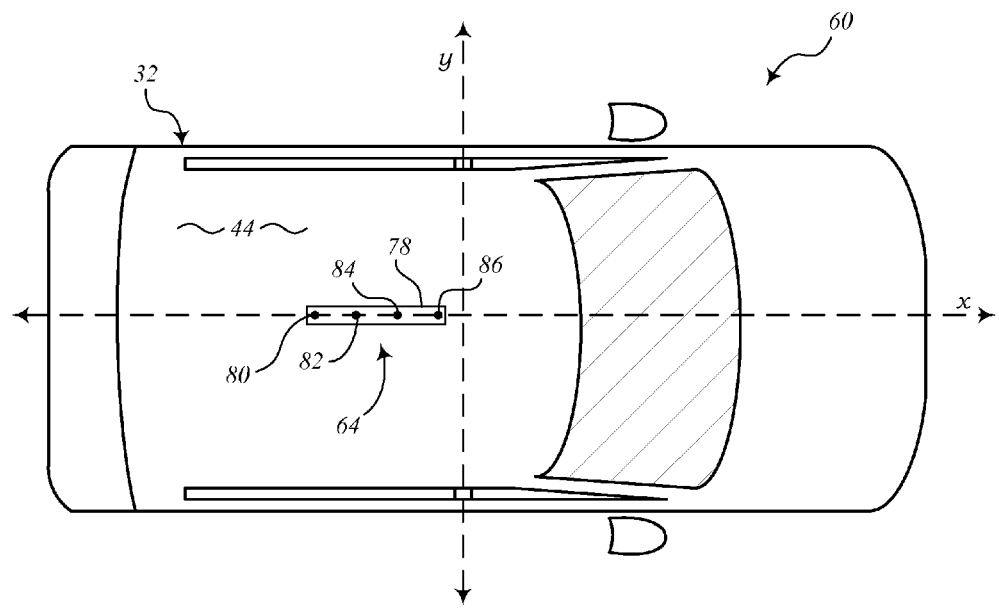

FIG. 4A is a side view of a meter reading system 60 according to a second embodiment. FIG. 4B is a top view of the meter reading system 60. The meter reading system 60 comprises a vehicle 32 and an antenna assembly 64. The antenna assembly 64 in the embodiment of FIGS. 4A and 4B includes a housing 78, a first antenna 80, a second antenna 82, a third antenna 84, and a fourth antenna 86. The antennas 80, 82, 84, and 86 may be mounted on top of the housing 78 and are oriented in an upward direction substantially parallel with the z axis. Again, if the top surface 44 of the vehicle 32 is not sufficiently horizontal, then various types of support and/or leveling equipment may be used to orient the antennas 80, 82, 84, and 86 in the upward direction. Also, the housing 78 may include leveling components and may include elements for protecting the top surface 44 of the vehicle 32. The housing 78 may also include components that are configured to minimize movement of the antenna assembly 64 with respect to the top surface 44 of the vehicle 32.

The antennas 80, 82, 84, and 86 are oriented with respect to each other such that they are substantially aligned with the x axis. In some embodiments, the antennas 80, 82, 84, and 86 may be positioned such that they form a plane that is substantially perpendicular to the x axis, or, in other words, is aligned with or substantially parallel to the plane formed by the y and z axes (not shown).

Figure 5:
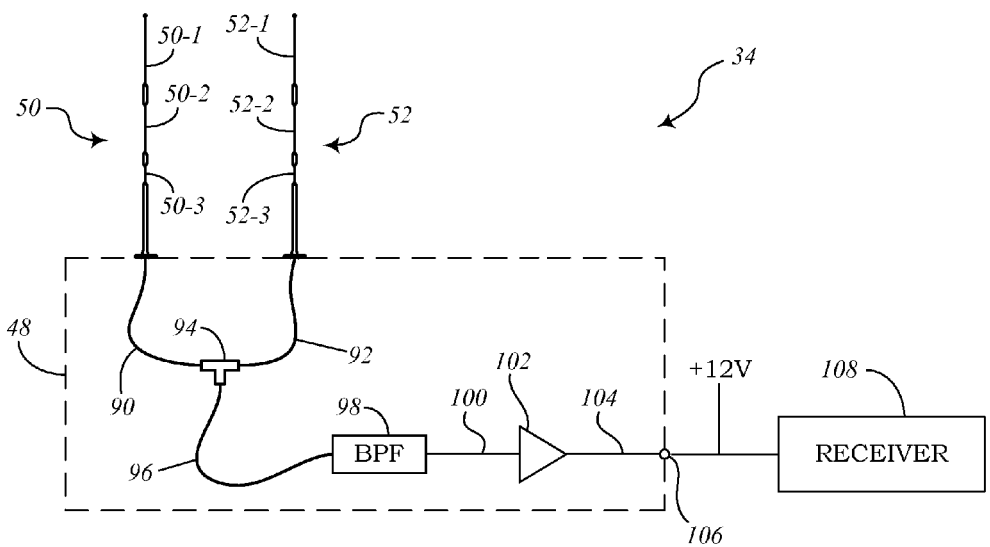
FIG. 5 is a circuit diagram of the antenna assembly shown in FIGS. 3A and 3B, according to various implementations of the present disclosure.

FIG. 5 is a circuit diagram illustrating an embodiment of the antenna assembly 34 shown in FIGS. 3A and 3B. The antenna assembly 34, as described above, includes the housing 48 (shown in phantom in FIG. 5), the first antenna 50, and the second antenna 52. It should be noted that the housing 48 shown in FIG. 5 is not necessarily to scale. As shown in FIG. 5, the antennas 50 and 52 each include three collinear elements. The first antenna 50 includes three elements 50-1, 50-2, and 50-3 and the second antenna 52 includes three elements 52-1, 52-2, and 52-3. As such, the antenna assembly 34 having two antennas where each antenna has three collinear elements forms an antenna array of 2×3 elements. According to other various implementations, the antenna assembly 34 may include any suitable number of antennas and each of the antennas may be configured with one, two, three, or more collinear elements to form other antenna arrays.

In order to create a desired radiation pattern, the antennas 50 and 52 are separated by a spacing of approximately one-half to five-eighths of the wavelength of transmission signals operating at a particular operational frequency. When designed to operate at 900 MHz, the antenna assembly 34 include a spacing between the antennas 50 and 52 of about 0.167 meters to about 0.208 meters, or between about 6.6 inches and 8.2 inches. The antenna assembly 34 may be configured to operate at a frequency of about 900 MHz or other frequency in the microwave range. In some embodiments, the antenna assembly 34 may operate in a higher frequency range, whereby the one-half to five-eighths wavelengths are an appropriate spacing for the antennas.

In addition to antennas, the antenna assembly 34 also includes components residing within the housing 48. A first high-impedance coaxial cable 90 is electrically connected to the first antenna 50 and a second high-impedance coaxial cable 92 is electrically connected to the second antenna 52. The first and second high-impedance coaxial cables 90 and 92 may have an impedance, for example, of 70 ohms (70 Ω). According to some embodiments, the preferred impedance of the coaxial cables 90 and 92 may be defined by the required transformation ratio. For example, for transforming a 50Ω antenna, such as antenna 50 or 52, to the 100Ωjunction shown at 94, the impedance (Z) of the coaxial cables 90 and 92 may be determined by:

$$Z=\sqrt{50\Omega \times 100\Omega} \approx 70.7\Omega$$

Also, the first and second cables 90 and 92 may have a length equal to three-fourths of the wavelength (¾λ) of the communication signals operating at the operational frequency of the antenna assembly 34. For example, with an operational frequency of 900 MHz, the length of the first and second cables 90 and 92 will be approximately 0.25 meters. While ¾λ is the preferred length, any odd multiple of ¼λ may be utilized (¼, ¾, 1¼, 1¾, etc.). In other embodiments, the length of cables 90 and 92 can be changed slightly in order to modify the radiation pattern of the antenna array.

The cables 90 and 92 are also electrically connected to a splitter 94. The splitter 94 may include passive elements and can reciprocally be configured as a combiner in this embodiment. The cables 90 and 92 and splitter 94 form a matching circuit for matching the signals from the two antennas 50 and 52 to an output of the splitter 94. For example, the combination of the cables 90 and 92 and splitter 94 may form a Wilkinson divider including a quarter-wave (¼λ) transformer. The Wilkinson divider may also include transmission lines, coaxial cables, or lumped components (i.e., inductors and capacitors).

From the splitter 94, the circuit includes a 50-ohm (50 Ω) coaxial cable 96 leading to a bandpass filter 98. Another 50-ohm (50 Ω) coaxial cable 100 extends from the bandpass filter 98 to a low-noise amplifier 102. In some embodiments, the amplifier 102 may receive power from a 12-volt supply, such as a 12-volt battery of the vehicle 32. The amplifier may receive this power directly from wires connected to the 12V vehicle battery (not shown), or it may receive the power via coaxial cable 104, as shown in FIG. 5. An output signal from the amplifier 102 is provided along the coaxial cable 104 to a receiver 108 for receiving signals corresponding to the utility data transmitted from the remote utility meters at the customers' locations. The amplifier 102 is preferably placed in the circuit near the antennas, which minimizes signal loss when the signals are transmitted along a length of cable to the receiver 108. In some embodiments, the receiver 108 may represent a transceiver along with the appropriate transmit/receive switching elements in order to both receive and transmit using the antenna assembly 34. In further embodiments, the receiver 108 may be located inside or outside of the housing 48 and in some cases may be located within an interior of the vehicle 32. In some embodiments, the housing may include a connector 106 connected to the end of the 50-ohm cable 104, wherein another cable (e.g., with a 50-ohm impedance) may be used for communicating signals from the output of the housing 48 to the receiver 108 and the 12-volt supply.

Figure 6:
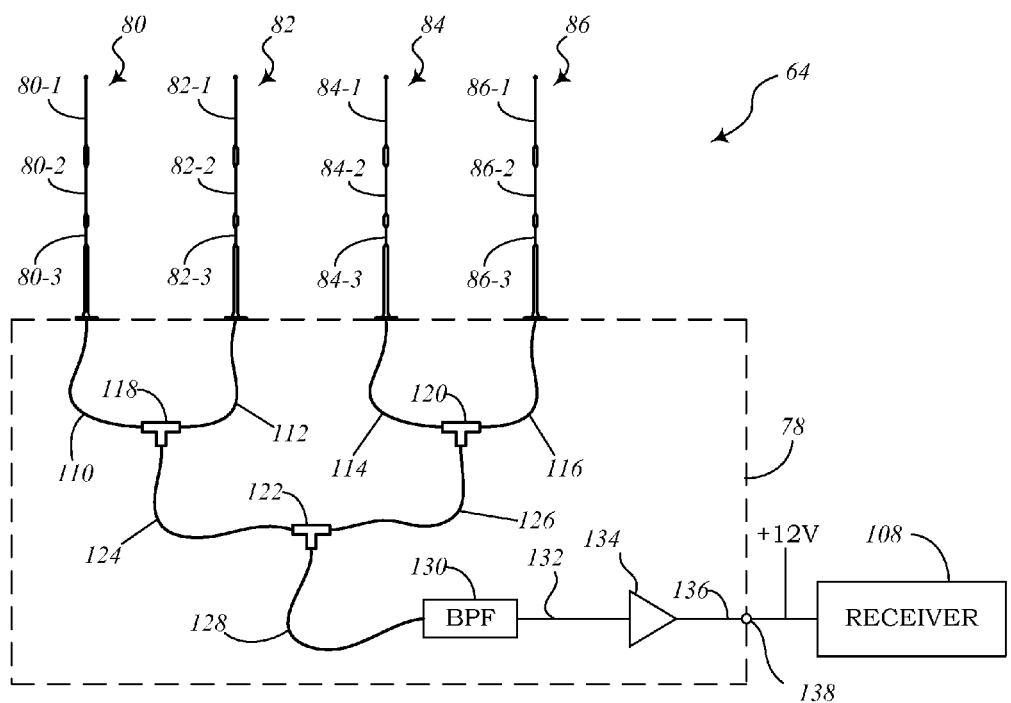
FIG. 6 is a circuit diagram of the antenna assembly shown in FIGS. 4A and 4B, according to various implementations of the present disclosure.

FIG. 6 is a circuit diagram illustrating an embodiment of the antenna assembly 64 shown in FIGS. 4A and 4B. The antenna assembly 64, as described above, includes the housing 78 (shown in phantom in FIG. 6), the first antenna 80, the second antenna 82, the third antenna 84, and the fourth antenna 86. It should be noted that the housing 78 shown in FIG. 6 is not necessarily to scale. As illustrated, the first antenna 80 includes three elements 80-1, 80-2, and 80-3, the second antenna 82 includes three elements 82-1, 82-2, and 82-3, the third antenna 84 includes three elements 84-1, 84-2, and 84-3, and the fourth antenna 86 includes three elements 86-1, 86-2, and 86-3. Each of the antennas 80, 82, 84, and 86 may alternatively be configured with any suitable number of collinear elements. According to the embodiment of FIG. 6, the four antennas each have three collinear elements form an antenna array of 4×3 elements. The number of collinear elements may be a factor of the practical length. If the antenna assembly 64 is utilized with higher frequencies, it may include a higher numbers of collinear elements.

In order to create a desired radiation pattern, the antennas 80, 82, 84, and 86 are separated by a spacing of approximately one-half to five-eighths of the wavelength of transmission signals operating at a particular operational frequency. When operating at 900 MHz, the spacing between the antennas 80, 82, 84, and 86 will thereby be about 0.167 to about 0.208 meters, or between about 6.6 inches and 8.2 inches. The antenna assembly 64 may be configured to operate at a frequency of about 900 MHz or other frequency in the microwave range. In some embodiments, the antenna assembly 64 may operate in an even higher frequency range, whereby the one-half to five-eighths wavelengths are an appropriate spacing for the antennas.

The antenna assembly 64 further includes components residing within the housing 78. A first high-impedance coaxial cable 110 is electrically connected to the first antenna 80, a second high-impedance coaxial cable 112 is electrically connected to the second antenna 82, a third high-impedance coaxial cable 114 is electrically connected to the third antenna 84, and a fourth high-impedance coaxial cable 116 is electrically connected to the fourth antenna 86. The high-impedance coaxial cables 110, 112, 114, and 116 may have an impedance based on the required transformation ratio, as described above. For example, the coaxial cables 110, 112, 114, and 116 may have an impedance of 70 ohms (70 Ω). Also, the cables 110, 112, 114, and 116 may have a length equal to three-fourths of the wavelength (λ¾) of the transmission signals, according to preferred embodiments. For example, when the transmission signals have a frequency of 900 MHz, the length of the cables 110, 112, 114, and 116 will be approximately 0.25 meters. As described further above, any odd multiple of ¼λ may be utilized for the length of the cables 110, 112, 114, and 116.

The first and second cables 110 and 112 are electrically connected to a first splitter 118 and the third and fourth cables 114 and 116 are electrically connected to a second splitter 120. The first and second splitters 118 and 120 may include passive elements and can reciprocally be configured as combiners in this embodiment. The first splitter 118 is connected to a third splitter 122 via a fifth high-impedance coaxial cable 124 and the second splitter 120 is connected to the third splitter 122 via a sixth high-impedance coaxial cable 126. The first, second, and third splitters 118, 120, and 122 may be Wilkinson dividers, which may include a quarter-wave (¾λ) transformer. The Wilkinson dividers may include transmission lines, coaxial cables, or lumped components (i.e., inductors and capacitors). The splitters 118, 120, and 122 are configured to provide isolation between the antennas and practically eliminate cross-talk between them. The cables 110, 112, 114, 116, 124, and 126 and the splitters 118, 120, and 122 form a matching circuit for matching the signals from the four antennas 80, 82, 84, and 86 to the output of the third splitter 122.

From the third splitter 122, the circuit includes a 50-ohm (50 Ω) coaxial transmission cable 128 leading to a bandpass filter 130. A 50-ohm (50 Ω) coaxial transmission cable 132 extends from the bandpass filter 130 to a low-noise amplifier 134. In some implementations, the amplifier 134 may receive power from a 12-volt supply, such as a 12-volt battery of the vehicle 62. An output signal from the amplifier 134 is provided to the receiver 108 via a 50-ohm cable 136. The receiver 108 may be located inside or outside of the housing 78 and in some cases may be located within an interior of the vehicle 62. The 12-volt supply may also supply power to the amplifier 134 via the 50-ohm cable 136. In some embodiments, the housing 78 may include a connector 138 connected to the end of the 50-ohm cable 136 with another cable connected between the connector 138 and the receiver 108 and 12-volt supply.

Figure 7:
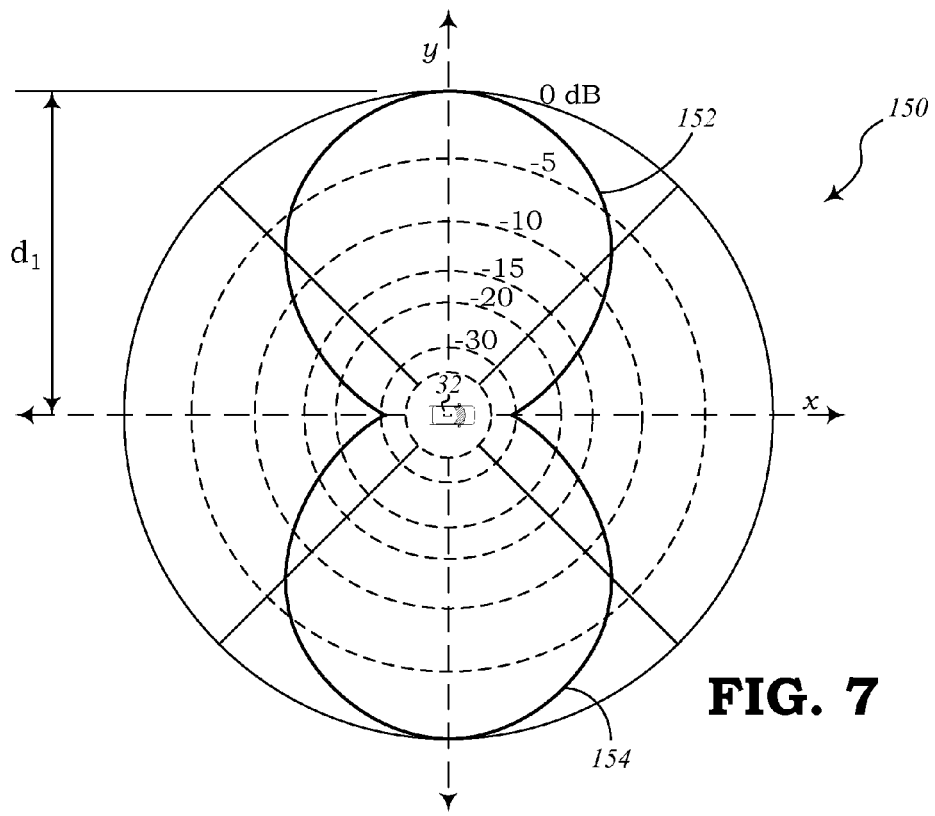
FIG. 7 is a diagram showing a radiation pattern of the meter reading systems shown in FIGS. 3-6 according to a first implementation.

FIG. 7 is a diagram illustrating the radiation pattern 150 of the antenna assemblies 34 and 64 shown in FIGS. 3-6. It should be noted that the radiation pattern 150 of the antenna assemblies 34, 64 corresponds to the extent that the antenna assemblies are capable of both transmitting signals and receiving signals. The radiation pattern 150 as shown can be obtained when the antenna assemblies 34, 64 are implemented such that the spacing between the antennas is equal to about one-half (½) of the wavelength of the communication signals. For instance, when the communication signals have a frequency of 900 MHz, the antenna assemblies 34 and 64 can be constructed such that the spacing between the antennas will be about 6.6 inches.

With the vehicle 32 directed along the x axis and the antennas aligned with the x axis, the antenna array creates a dual azimuth radiation pattern, wherein a first lobe 152 is substantially symmetrical about the y axis and directed to the left side of the vehicle 32 and a second lobe 154 is substantially symmetrical about the y axis and directed to the right side of the vehicle. It should be noted that the maximum gain of the antenna assemblies in this embodiment is directed toward the sides (along the y axis). With the antennas being one-half wavelength apart, communication signals from the antennas directed along the x axis will be 180° out of phase from each other and will substantially cancel each other out, which is evident in FIG. 7 where the radiation pattern 150 is minimal along the x axis. Because utility meters will normally be positioned off to the sides of the streets, the antenna assemblies described herein are configured in such a way so as to maximize the sideways communication capabilities as opposed to an omnidirectional range that results from use of the conventional systems.

Figure 8:
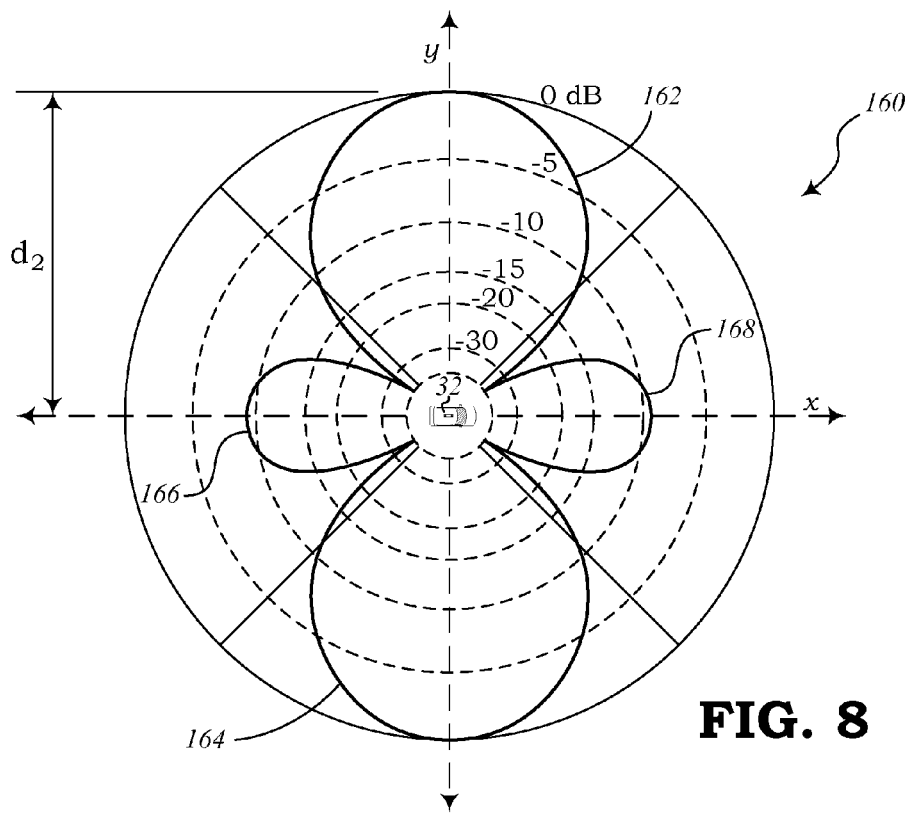
FIG. 8 is a diagram showing a radiation pattern of the meter reading systems shown in FIGS. 3-6 according to a second implementation.

FIG. 8 is a diagram illustrating the extent of an approximate radiation pattern 160 of the antenna assemblies 34 and 64 shown in FIGS. 3-6. This radiation pattern 160 can be obtained when the antenna assemblies 34, 64 are implemented such that the spacing between the antennas is equal to about five-eighths of the wavelength of the communication signals. For instance, when the communication signals have a frequency of 900 MHz, the antenna assemblies 34 and 64 can be constructed such that the spacing between the antennas will be about 8.2 inches.

With the vehicle 32 directed along the x axis and the antennas aligned with the x axis, the antenna array creates a first lobe 162 substantially symmetrical about the y axis and directed to the left side of the vehicle and a second lobe 164 substantially symmetrical about the y axis and directed to the right side of the vehicle. The greatest gain is to the sides of the vehicle substantially along the y axis. The radiation pattern 160 also include a first side lobe 166 and a second side lobe 168 oriented along the x axis. The side lobes 166 and 168 are directed behind the vehicle and in front of the vehicle, respectively. Because utility meters will normally be positioned off to the sides of the streets, the antenna assemblies 34 and 64 herein are configured in such a way to maximize the broadside communication capabilities as opposed to an omnidirectional range as used in conventional systems.

By using the antenna assemblies 34 and 64 shown in FIGS. 3-6, a distance "$d_1$" from the antenna array to a far extent of the lobes 152 and 154 (using one-half wavelength spacing as described with respect to FIG. 7) may be more than 1,500 feet, and may be as far as, or even farther than, 2,000 feet. A distance "$d_2$" from the antenna array to a far extent of the lobes 162 and 164 (using five-eighths wavelength spacing as described with respect to FIG. 8) may be more than 2,000, and may be as far as, or even farther than, 2,500 feet. The five-eighths wavelength spacing provides narrower main lobes 162 and 164 than the main lobes 152 and 154 of the one-half wavelength spacing, which also results in a farther broadside extent. It should be noted that the radiation patterns shown in FIGS. 7 and 8 have been normalized, and that the lobes of maximum gain are far greater than the 0 dB shown in the figures.

Therefore, the embodiments described in the present disclosure may be configured such that resulting radiation patterns have a broadside reach of three to five times greater than the broadside reach obtainable with conventional systems. In this respect, the meter reading systems 30 and 60 described herein may be able to communicate with utility meters 18 without requiring the vehicle 32 to travel down every side street, cul-de-sac, or alley. In some case, the meter reading systems described in the present disclosure may be able to communicate with many more utility meters 18 while simply travelling down main roads.

In further embodiments, the antenna assembly 34 shown in FIGS. 3 and 5 may be oriented perpendicular to the travel direction of the vehicle 32. With the described phasing, the radiation pattern shown in FIG. 7 would also be rotated 90°. In order to achieve a more desirable pattern, the phasing relationships between coaxial cables 90 and 92 may be altered or the spacing between antennas 50 and 52 may be changed. For example, a ½λ length of cable may be inserted or removed from either coaxial cable 90 or 92. Alternatively, the spacing between the two antennas 50 and 52 may be changed to about 1λ without changing the lengths of cables 90 or 92. This configuration may be referred to as an "endfire" array. Similar modifications may be made to length of coaxial cables 110, 112, 114, and 116 and/or the spacing between antennas 80, 82, 84, and 86 to achieve an endfire array configuration.

It should be emphasized that the above-described embodiments are merely examples of possible implementations. Many variations and modifications may be made to the above-described embodiments without departing from the principles of the present disclosure. All such modifications and variations are intended to be included herein within the spirit and scope of the present disclosure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

The various implementations described herein are not intended to limit the present disclosure, but may include additional features and advantages not necessarily expressed herein. The additional features and advantages may be apparent to one of ordinary skill in the art upon examination of the detailed description and accompanying drawings, according to spirit and scope of the present disclosure. It is intended that all such additional features and advantages be included within the present disclosure and protected by the accompanying claims.

What is claimed is:

1. A system comprising:
a receiver configured to receive wirelessly transmitted data from a plurality of utility meters at customer locations; and
an antenna assembly operatively coupled to the receiver and configured to be mounted on a top surface of a vehicle, the antenna assembly comprising a housing, a plurality of electrical components, and a plurality of antennas, each of the plurality of antennas connected to a top of the housing, each antenna extending from the top of the housing in a direction substantially perpendicular to the ground, each of the plurality of electrical components connected inside the housing,
wherein the plurality of antennas are arranged in a plane substantially parallel with a first axis corresponding to a forward direction of the vehicle, wherein the antenna assembly creates a pattern generally directed in opposite directions about a line substantially parallel to the ground and perpendicular to the first axis, and wherein the antenna assembly is configured to receive the wirelessly transmitted data from the plurality of utility meters,
wherein the plurality of electrical components comprises at least a coaxial cable, a bandpass filter, and a low noise amplifier, wherein an output from the low noise amplifier is supplied via a the coaxial cable to the receiver located inside the vehicle, and wherein the low noise amplifier is configured to receive a 12V DC signal from the vehicle.

2. The system of claim 1, wherein each of the plurality of antennas comprises three collinear elements and operates at a frequency of 900 MHz.

3. The system of claim 1, wherein the plurality of antennas are substantially parallel to each other and are separated by a distance of between one-half to five-eighths of an operational wavelength.

4. The system of claim 3, wherein the plurality of electrical components further comprises a Wilkinson divider having a splitter and high-impedance coaxial cables, wherein the high-impedance coaxial cables have a length of approximately three-fourths of the operational wavelength, and wherein the Wilkinson divider matches the plurality of antennas to a 50-ohm impedance.

5. A meter reading apparatus comprising:
a receiver configured to receive wirelessly transmitted data from a plurality of utility meters; and
an antenna assembly including at least a housing, a plurality of electrical components, and a plurality of antennas, each of the plurality of antennas mounted on a top of the housing at a predetermined spacing based on a wavelength of communication signals carrying the wirelessly transmitted data, the housing configured to be mounted on a top surface of a vehicle, each of the plurality of electrical components connected inside the housing, each antenna extending from the top of the housing in an upward direction, wherein the plurality of antennas are arranged in a plane substantially parallel to a forward direction of the vehicle and configured to receive the wirelessly transmitted data from the plurality of utility meters,
wherein the plurality of electrical components form a Wilkinson divider having a splitter and high-impedance coaxial cables, wherein the high-impedance coaxial cables have a length substantially equal to an odd multiple of one-fourth of the wavelength of communication signals carrying the wirelessly transmitted data resonating at microwave frequencies.

6. The meter reading apparatus of claim 5, wherein the plurality of antennas comprise two antennas.

7. The meter reading apparatus of claim 5, wherein the plurality of antennas comprise four antennas.

8. The meter reading apparatus of claim 5, wherein each of the plurality of antennas comprises three collinear elements.

9. The meter reading apparatus of claim 5, wherein the plurality of antennas are substantially parallel to each other, and wherein the predetermined spacing is one-half to five-eighths of the wavelength of communication signals carrying the wirelessly transmitted data.

10. The meter reading apparatus of claim 5, further comprising a bandpass filter and a low-noise amplifier supported inside the housing, wherein an output from the low-noise amplifier is supplied via a coaxial cable to the receiver located inside the vehicle, and wherein the low-noise amplifier is configured to receive a 12V DC signal from the vehicle.

11. An antenna assembly comprising:
a first high-impedance coaxial lead;
a second high-impedance coaxial lead;
a splitter;
a bandpass filter;
an amplifier;
a housing configured to be mounted on a top surface of a vehicle, the first high-impedance coaxial lead, the second high-impedance coaxial lead, the splitter, the bandpass filter, and the amplifier operably connected inside the housing;
a first antenna vertically configured to be mounted on a top of the housing;
a second antenna vertically configured to be mounted on the top of the housing at a predetermined spacing from the first antenna based on a wavelength of communication signals carrying wirelessly transmitted data to be received by the antenna assembly; and
a receiver configured to receive the communication signals from a plurality of wireless utility meters via the first and second antennas,
wherein the first and second antennas are aligned with a direction of travel of the vehicle.

12. The antenna assembly of claim 11, wherein each of the first and second antennas comprises three elements.

13. The antenna assembly of claim 12, wherein the three elements are collinear.

14. The antenna assembly of claim 11, wherein the communication signals resonate at a frequency of 900 MHz.

15. The antenna assembly of claim 11, wherein the first antenna and second antenna are substantially parallel to each other, and wherein the predetermined spacing is between one-half to five-eighths of a the wavelength of communication signals carrying the wirelessly transmitted data.

16. The antenna assembly of claim 11, wherein the first high-impedance coaxial lead, the second high-impedance coaxial lead, and the splitter form a Wilkinson divider matching the first and second antennas to a 50-ohm impedance.

17. The antenna assembly of claim 16, wherein the first high-impedance coaxial lead and the second high-impedance coaxial lead each have a length substantially equal to an odd multiple of one-fourth of the wavelength of communication signals.

18. The antenna assembly of claim 11, further comprising a third antenna and a fourth antenna mounted on the top of the housing at the predetermined spacing.

* * * * *